United States Patent
Öhman et al.

(10) Patent No.: US 6,893,529 B1
(45) Date of Patent: *May 17, 2005

(54) METHOD OF PRODUCING A LAMINATE MATERIAL

(75) Inventors: Peter Öhman, Lund (SE); Rolf Lasson, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

This patent is subject to a terminal disclaimer.

(21) Appl. No.: 08/718,692

(22) Filed: Sep. 27, 1996

Related U.S. Application Data

(63) Continuation of application No. 08/310,790, filed on Sep. 27, 1994, now abandoned.

(30) Foreign Application Priority Data

Oct. 5, 1993 (SE) .............................................. 9303241

(51) Int. Cl.[7] .......................... B32B 31/08; B32B 31/12; B32B 31/20
(52) U.S. Cl. ................. 156/272.6; 156/182; 156/274.6; 156/308.2; 156/324
(58) Field of Search .............................. 156/182, 272.6, 156/274.6, 308.2, 324, 272.2, 273.3, 274.4, 322

(56) References Cited

U.S. PATENT DOCUMENTS

| | | | |
|---|---|---|---|
| 3,188,265 A | * | 6/1965 | Charbonneau et al. ... 156/274.4 X |
| 3,249,482 A | | 5/1966 | Gilfillan |
| 3,823,061 A | | 7/1974 | Frayer et al. ............... 428/516 |

(Continued)

FOREIGN PATENT DOCUMENTS

| | | | | |
|---|---|---|---|---|
| FR | 1582480 | * | 9/1969 | ............. 156/244.23 |
| JP | 56881 | * | 5/1976 | ............. 156/244.11 |
| JP | 120791 | * | 10/1978 | ............. 156/244.11 |

(Continued)

OTHER PUBLICATIONS

George Odian, Principles of Polymerization, John Wiley & Sons, pp. 288–290, 1981.*
Extrusion Coating Technology, MBS Study No. 1300, Jul., 1993.

Primary Examiner—Melvin C. Mayes
(74) Attorney, Agent, or Firm—Burns, Doane, Swecker & Mathis, LLP

(57) ABSTRACT

The disclosure relates to a method of producing a well-integrated laminate material, for example a packaging laminate, in which method a first web (10a) of plastic, and a second web (10b) of plastic are brought together and permanently united to one another by the simultaneous application of heat and pressure, for the formation of the laminate material (10). In order to improve the adhesion between the webs (10a and 10b), these are subjected to a surface-activating treatment of non-chemical nature, preferably a corona treatment, prior to the uniting of the webs, whereby good adhesion and bonding between the webs is achieved without the employment of interjacent chemical adhesives.

Figure 1:
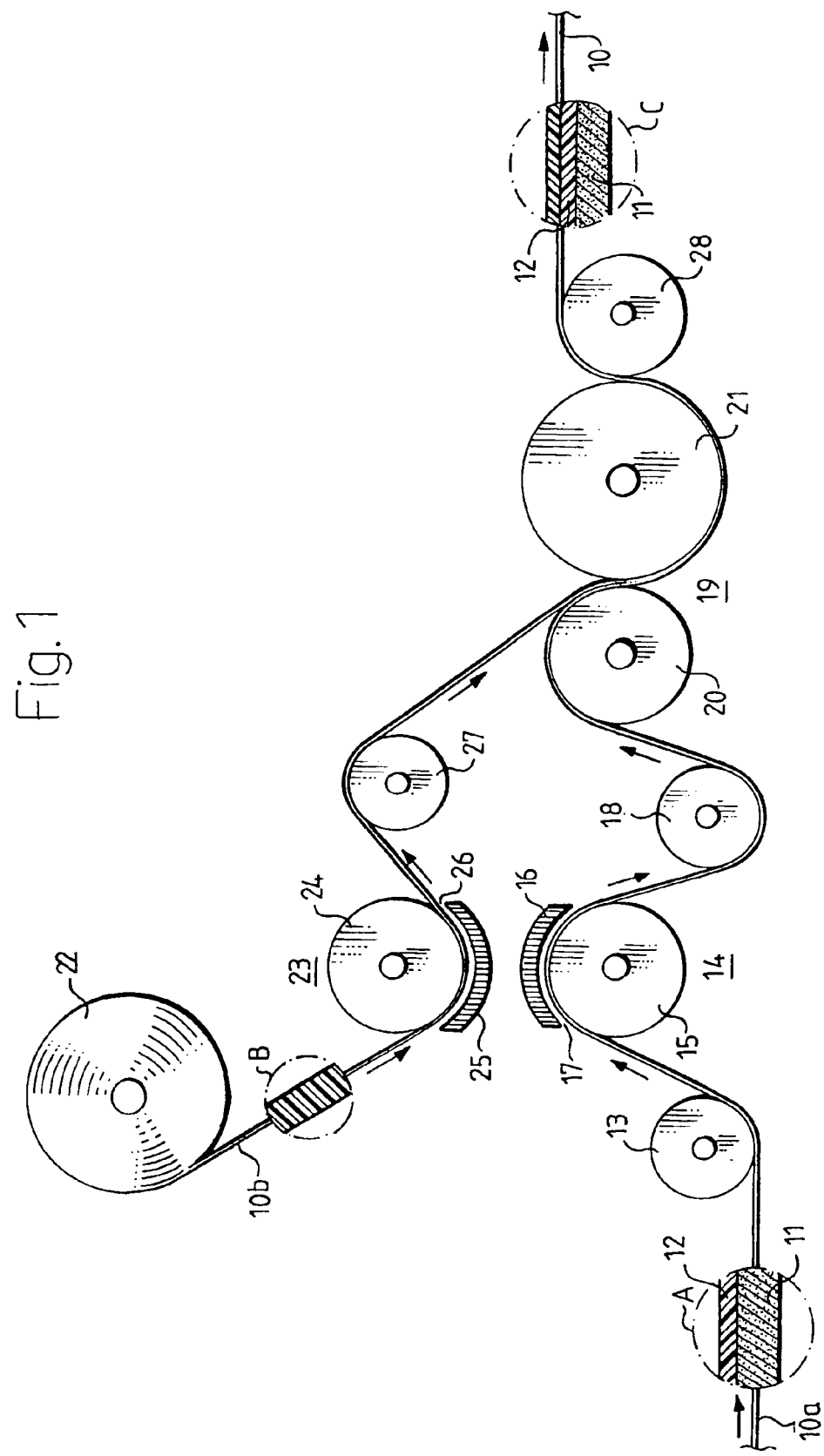

The method is preferably reduced into practice employing rollers (20 and 21) which are of different hardnesses, the relatively softer roller (20) being disposed to be movable in relation to the relatively harder roller (21) in such a manner that the nip between the rollers (20 and 21) through which both of the united webs are led may be adjusted at a suitable pressure, and that the nip obtains a certain width or extent in the linear direction of the webs as a result of the penetration of the relatively harder roller (21) into the surface of the compressing, relatively softer roller (20).

11 Claims, 2 Drawing Sheets

U.S. PATENT DOCUMENTS

| | | | | |
|---|---|---|---|---|
| 3,901,755 A | * | 8/1975 | Martin et al. | |
| 3,959,567 A | | 5/1976 | Bradley | 428/461 |
| 3,985,604 A | * | 10/1976 | Balla | 156/244.17 |
| 4,048,736 A | | 9/1977 | Castleman et al. | 40/2 R |
| 4,234,644 A | * | 11/1980 | Blake et al. | 156/182 X |
| 4,238,266 A | * | 12/1980 | Steinberg et al. | 156/243 |
| 4,365,716 A | * | 12/1982 | Watt | 156/272.6 X |
| 4,370,190 A | * | 1/1983 | Ichinose et al. | 156/307.3 |
| 4,395,459 A | * | 7/1983 | Herschdorfer et al. | 156/244.23 X |
| 4,432,820 A | * | 2/1984 | Thompson | 156/244.11 X |
| 4,436,685 A | | 3/1984 | Emura et al. | |
| RE32,270 E | * | 10/1986 | Murray, Jr. | |
| 4,772,348 A | * | 9/1988 | Hirokawa et al. | 156/272.6 |
| 4,778,557 A | * | 10/1988 | Schirmer | 156/555 X |
| 4,784,885 A | * | 11/1988 | Carespodi | 428/36.8 |
| 4,854,995 A | * | 8/1989 | Kasper et al. | 156/243 |
| 4,854,999 A | * | 8/1989 | Schirmer | 156/272.6 |
| 4,855,187 A | * | 8/1989 | Osgood, Jr. et al. | 156/244.11 X |
| 4,871,406 A | * | 10/1989 | Griffith | 156/244.17 X |
| 4,895,611 A | * | 1/1990 | Bryniarski et al. | 156/285.1 X |
| 4,987,025 A | * | 1/1991 | Shiraki et al. | |
| 4,994,632 A | * | 2/1991 | Bosisio et al. | 156/272.2 X |
| 5,026,594 A | * | 6/1991 | Akao | 428/220 |
| 5,238,517 A | * | 8/1993 | Heyes | 156/243 |
| 5,256,234 A | * | 10/1993 | Mutaguchi et al. | 156/244.27 |
| 5,296,070 A | * | 3/1994 | Take et al. | 156/244.11 |
| 5,676,791 A | * | 10/1997 | Christel | 156/272.6 X |

FOREIGN PATENT DOCUMENTS

| | | | | |
|---|---|---|---|---|
| JP | 53-120791 | * | 10/1978 | |
| JP | 130399 | | 7/1984 | 156/244.11 |
| JP | 2275134 | * | 11/1987 | 156/272.6 |
| JP | 63-160835 | | 7/1988 | |
| JP | 404093252 | * | 3/1992 | 156/272.6 |

* cited by examiner

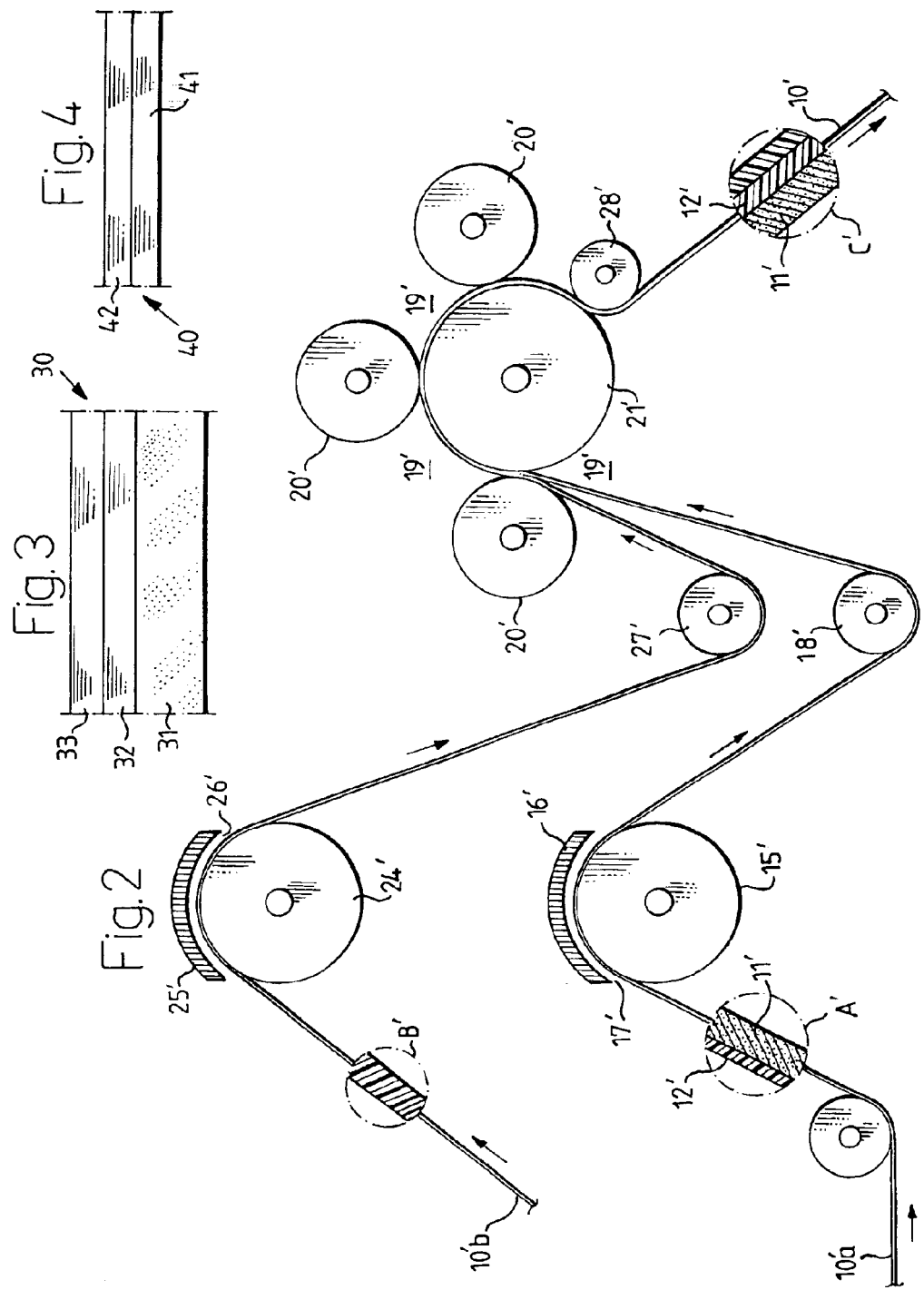

METHOD OF PRODUCING A LAMINATE MATERIAL

This is a continuation of U.S. application Ser. No. 08/310,790, filed Sep. 27, 1994, now abandoned.

FIELD OF THE INVENTION

The present invention relates to a method of producing a laminate material, for example packaging laminate, in which method a first web of plastic and a second web of plastic are brought together and permanently united with one another under simultaneous application of heat and pressure.

BACKGROUND OF THE INVENTION

Packaging laminates comprising united layers of plastic and/or other materials are often employed for packages of the single-use disposable type, and there occur on the market not only simple, flexible packaging laminates comprising a limited number of layers, but also complex, rigid packaging laminates comprising a plurality of layers in expediently selected mutual combinations.

Irrespective of whether the packaging material is of one type or the other, it is important that the composition of the individual packaging laminate be such that a package produced from the packaging laminate is given the best possible operative preconditions to be capable of storing a product in a manner which reliably safeguards the product. Thus, the requirements on the packaging laminate are that it must possess not only mechanical and chemical but also other desirable—and necessary—properties in order to make for adequate product protection, at the same time as the packaging laminate must, naturally, be economically viable and easy to produce and form into packages on a rational industrial scale.

One conventional packaging laminate for configurationally stable single-use disposable packages comprises a core layer of paper or paperboard which imparts to the package the requisite mechanical strength and configurational stability, and outer coatings of thermoplastic, preferably polyethylene, which impart to the package tightness properties in respect of moisture and liquid. The outer thermoplastic coatings also possess the advantage that they are heat-sealable (or fusible) in such a way that mutually facing thermoplastic surfaces may be brought to surface fusion and bonding with one another under the application of heat and pressure, for the formation of mechanically strong and liquid-tight sealing seams or joints during the reforming of the packaging laminate into packages.

Another conventional packaging laminate for the above-described type of single-use packages also comprises a core layer of paper or paperboard and outer coatings of thermoplastic, preferably polyethylene, and moreover one or more additional layers of material which are intended to impart to the package supplementary tightness properties. One such packaging laminate calls for the employment of aluminium foil (Alifoil) on the one side of the core layer, between the core layer and the outer thermoplastic layer of the packaging laminate, in order to make the package oxygen gas tight when it is to be employed together with products which are sensitive to oxygen gas. Another packaging laminate calls for the use of one or more polymer layers instead of, or as a complement to the above Alifoil, in order to impart to the package oxygen gas tightness and/or tightness properties vis-à-vis certain types of flavorings, essential oils or the like which may occur in the product. Examples of such barrier polymers as have hitherto been employed in the art are polyesters, polyamides, polyvinyl pyrolidone, ethyl vinyl alcohol copolymer (EVOH) etc. Yet a further example of a barrier material might be silicon oxide ($S_iO_x$) which also imparts to the package tightness properties in respect of oxygen gas and substances of the above-mentioned type.

Simple, flexible packaging laminates for packages of the bag type may, for instance, include two mutually united plastic layers and an interjacent layer of an Alifoil or barrier polymer of the above-mentioned type.

Both flexible and rigid packaging laminates are normally produced by a lamination process which is based on the concept that prefabricated webs of plastic or plastic-coated other materials are brought together and permanently united with one another by the application of heat and pressure. In, for example, a conventional packaging laminate, a prefabricated web of plastic-coated paper is brought together with a prefabricated film web of barrier polymer and these are led together through the nip between two rotating press rollers, at the same time as a binder or sealing plastic acting as a binder is applied between the webs in order permanently to unite the webs to one another. Alternatively, one and/or the other web may be pretreated with a so-called primer which is applied on the contact surface of the web or webs, respectively, and which is activated by the application of heat during the lamination process, in order to increase, or make possible, adhesion between the webs. In the production of a flexible packaging laminate comprising but two plastic layers, the corresponding procedure is utilized in that a first prefabricated web of plastic and a second prefabricated web of plastic are brought together and led together through the nip between two rotating press rollers, at the same time as a binder or sealing plastic acting as a binder is applied between the webs in order permanently to unite them to one another. Also in this case, one web and/or the other may be pretreated with an adhesion-promoting agent (primer) which is activated by the application of heat during the lamination process.

At the same time as the above-described, conventional film lamination methods produce packaging laminates possessing a high degree of integrity and good internal cohesion between the material layers included, they all suffer from serious drawbacks and inconveniences, in that they employ binding agents (adhesive, primer) which are often associated with environmentally hazardous organic solvents. Even though there are binders and adhesives which do not employ such solvents, it has hitherto proved difficult to incorporate them successfully into the rational, industrial production of packaging laminates with the desired integrity and cohesion and, in certain cases, it has moreover proved unavoidable to employ solvent-based binders or adhesives for permanently uniting films or webs of plastics which defy ready fusion or plastics which cannot be united with one another by surface fusion under the application of heat and pressure (heat sealing).

OBJECTS AND SUMMARY

One object of the present invention is therefore to obviate the above-outlined drawbacks and inconveniences and to propose an improved method of producing a laminate material, for example a packaging laminate.

A further object of the present invention is to produce a packaging laminate possessing a high degree of integrity and internal cohesion on a rational, industrial scale, without the employment of environmentally hazardous binders or adhesives.

These and other objects are attained according to the present invention.

By subjecting those respective plastic surfaces of the webs which are intended to be brought together and united to one another to a surface-activating treatment which employs no chemical binders, it is possible according to the present invention to unite the webs with one another with superior internal cohesive binding force, irrespective of whether the contact surfaces of the webs consist of plastics which mutually defy ready unification or which are wholly incompatible in terms of unification and otherwise would require an interjacent chemical binder or sealing layer in order to be capable of being permanently bonded to one another.

The non-chemical surface activating treatment of the webs is carried out in connection with, preferably immediately before, the webs being brought together and, in principle, is based oh the concept that a high-frequency electric field through which each respective web is passed activates surface molecules or molecule fractions occurring in the plastic or plastics in such a manner that the plastics will become mutually reactive and may permanently bond to one another.

Surface-activating treatments of this type are per se known and; for example, include so-called plasma-treating, corona-treating, flame-treating and others and it has proved according to the invention that a surface-activating treatment in accordance with the corona technique (corona-treating), possibly in combination with ozone, is particularly advantageous and eminently usable for permanently uniting webs of plastics which are otherwise incompatible or defy ready bonding and unification.

As has been mentioned above, it is a common occurrence in packaging technology that a web of polyethylene-coated paper is to be laminated to another web of plastic of the type which is not easily united with polyethylene without the employment of chemical binding agents (adhesives). According to the present invention however, it is possible for such webs easily to be united with one another to form a thoroughly integrated and reliably cohesive packaging laminate by subjecting the webs to the above-mentioned surface-activating treatment and, according to one particularly preferred embodiment of the present invention, use is made, as the above-mentioned polyethylene coating on the paper web, of a film of polyethylene which is extruded at an extrusion temperature (Tex) which is considerably higher than that temperature (Tm) at which the extruded polyethylene normally melts. Practical experiments which have been carried out in accordance with the present invention have surprisingly shown that polyethylene films which are extruded at different temperatures display different susceptibilities to the surface-activating treatment and give different bonding strengths on binding or adhesion to other not-readily compatible plastics, and in particular it has proved that the bonding strength increases if the polyethylene film is extruded at a temperature above a certain so-called breakpoint temperature which lies-considerably higher than the temperature at which polyethylene normally melts. The exact breakpoint temperature for polyethylene is to some extent dependant upon quality and may differ for different qualities, but may easily be determined by persons skilled in the art for each pertinent polyethylene quality by simple experiments.

According to another preferred embodiment of the present invention, the webs are brought together and led together through the nip between two rotating press rollers of mutually different surface hardnesses, of which the one (preferably the relatively softer roller) is disposed to be capable of being moved in relation to the relatively harder roller in such a manner that a suitable nip (pressure) may be set between the rollers when the webs are passed through the nip. Practical experiments which have once again been carried out in accordance with the present invention have surprisingly shown that good lamination results may be achieved if the rollers are set in such a manner that the nip between the rollers is given a width or extent in the linear direction of the webs which is based on the impression of the relatively harder roller into the surface of the relatively softer roller, whereby adhesion-inhibiting entrapments of air and steam between the webs are reduced or wholly eliminated. A combination of rollers which has proved to function particularly well in this respect consists of a relatively soft roller of rubber-clad steel which is disposed to be pressable against a relatively harder roller consisting of a cylindrical core of steel which is externally clad with Teflon® or other heat resistant material which does not adhere to plastic. A further advantage will be attained according to the present invention by also providing the rubber-clad steel roller with an outer coating of Teflon® or other suitable heat resistant material which aids in avoiding tacking or sticking of plastic onto the roller surfaces.

According to yet a further embodiment of the present invention, use may be made, instead of a roller nip, of a plurality of roller nips disposed in sequence, through which the two united webs are led in sequence. Production engineering advantages will be gained in this case if the temperature at each respective roller pair is different and is progressively increased to the desired final temperature at the last roller pair, and yet further advantages will be attained according to the present invention in that the relatively harder roller in each respective roller pair consists of one and the same roller common to all roller pairs, while the relatively softer rollers in each respective roller pair are peripherally distributed about the periphery of the common roller.

BRIEF DESCRIPTION OF THE ACCOMPANYING DRAWINGS

Further advantages and favourable characterizing features in the method according to the present invention will be apparent from the following detailed description of the present invention, with reference to the accompanying figures. In the accompanying figures:

FIG. 1 schematically illustrates the principle of production of a laminate material according to one embodiment of the method of the present invention;

FIG. 2 schematically illustrates the principle of production of a laminate material according to another embodiment of the method of the present invention; and FIGS. 3 and 4 schematically illustrate cross sections through different types of laminate materials produced by the method of the present invention.

DESCRIPTION OF PREFERRED EMBODIMENTS

Though the present invention will be described hereinbelow with particular reference to a packaging laminate, it should nevertheless be observed that, in broadest scope, the present invention is naturally not restricted exclusively to this practical application selected by way of example of one among many other conceivable laminate materials which may be produced using the method according to the invention. It should also be observed that the compositions of such a packaging laminate specifically selected in the following description likewise constitute but examples among many other conceivable composition alternatives. In order to avoid any possible misunderstanding, it should moreover be added that the expression 'web of plastic' which occurs often in the description (as well as in the appended claims) is intended to encompass not only single-layer webs consisting exclusively of plastics, but also multi-layer webs comprising at least one outer layer of plastic which, in a suitable manner, has been applied to the one side of the web.

Referring to the drawings, FIG. 1 schematically illustrates the principle of the production of a well integrated laminate material or packaging laminate 10 in the manner according to one embodiment of the present invention, in which a first web of plastic 10a and a second web of plastic 10b are brought together and permanently united to one another under the simultaneous application of heat and pressure, for the formation of the finished packaging laminate 10.

In the illustrated embodiment, the web 10a may, as is apparent from the enlarged, encircled region A, comprise a core layer 11 of paper or paperboard of suitable quality for packaging purposes, and an outer layer 12 of thermoplastic, preferably polyethylene, applied to one side of the core layer 11. The web 10a, which is unwound in the direction intimated by the arrow from a magazine reel (not shown), is a prefabricated material web which, in accordance with known technology, is produced by an extrusion operation during which the selected thermoplastic is extruded onto the one side of the paper or paperboard layer 11, for forming the outer thermoplastic coating 12. According to the present invention, it has here proved to be particularly advantageous (as was mentioned previously) to extrude the thermoplastic at an extrusion temperature Te which lies considerably above the temperature Tm at which the thermoplastic normally melts. For polyethylene, this extrusion temperature Te is approx. 280° C.

As is apparent from the enlarged, encircled region B, the second web 10b consists, in this example, of a prefabricated web-like plastic film. Examples of applicable plastics (which may be coated with printing ink) for this plastic film could be PET, OPET, LDPE, HDPE, OHDPE, OLDPE, PP, OPP, EVOH, and others. Further, the second web 10b may include a plurality of laminated layers of which the above-mentioned plastic film is disposed as the outer layer in these alternatives (not shown). The second web 10b may also include layers of other materials than plastic, such as aluminium (Alifoil), silicon oxide ($S_iO_x$ film), etc. The choice of the composition of the second web 10b is determined by the fields of the application of the packaging laminate 10, i.e. ultimately by the intended use of the package produced from the packaging laminate 10. If the packaging laminate 10 is intended for packages for oxygen gas sensitive products such as juice, wine, cooking oil etc., the second web 10b suitably consists of a material possessing good oxygen gas barrier properties, eg. EVOH which also imparts to the package good barrier properties in respect of flavoring substances occurring in the product, essential oils etc. A packaging laminate 10 including a plastic layer of EVOH possesses excellent so-called "non-scalping" properties, making the packaging laminate eminently usable for packages for the long-term storage of citrus juices.

In FIG. 1, the first web 10a is led via a first bending roller 13 to a station at 14 for surface activation of the outer thermoplastic coating 12 of the first web 10a. At the station 14, which comprises a rotary electrode drum 15 and an earthed screen 16 at least partly surrounding the periphery of the drum 15 and defining, between itself and the drum 15, a passage 17 through which the web 10a is led in contact with the periphery of the drum 15. Between the electrode drum 15 and the screen 16, a high frequency electric field is created in the passage 17, through which field the web 10a is led for adhesion-promoting surface activation of the outer thermoplastic coating 12.

From the station 14, the surface activated web 10a is led via a further bending roller 18 to the nip at 19 between two rotating press rollers 20 and 21 for uniting with a second web 10b simultaneously unwound from a magazine reel 22. The second web 10b is also led through a station at 23 for surface activation of the plastic in the second web, in the same manner as the first web 10a. Like the station 14, the station 23 includes an electrode drum 24 and a screen 25 at least partly surrounding the periphery of the drum 24 and defining, between itself and the drum 24, a passage 26 through which the second web 10b is led. Also in this case, a high frequency electric field occurs in the passage 26, by means of which field the plastic in the second web 10b is surface activated for promoting adhesion.

From the station 23, the surface activated second web 10b is led via a bending roller 27 to the nip 19 between the rollers 20 and 21 for uniting with the first web 10a with its surface activated plastic facing towards the surface activated thermoplastic coating 12 of the first web 10a. The two united webs 10a and 10b are led through the nip between the press rollers 20 and 21 which, by means of pressure and heat supply, compress the two webs together for the formation of the well integrated packaging laminate 10 which is unwound from the periphery of the roller 21 via a take-off roller 28 disposed adjacent the roller 21.

The surface activating treatment at the stations 14 and 23 may advantageously be a corona-treatment, even though other similar surface treatments are possible, such as plasma-treating, flame-treating etc., which are all conventional and well-known to a person skilled in the art.

As has been mentioned above, the two rollers 20 and 21 preferably display mutually different surface hardnesses, the illustrated smaller roller 20 preferably being the relatively softer roller of the two. The roller 20 is further disposed to be capable of being displaced in relation to the roller 21 for adjustment of a suitable nip, while the larger roller 21 (which is the relatively harder) is stationary.

As was mentioned earlier, the relatively harder roller 21 may consist of steel, while the relatively softer roller 20 may comprise a cylindrical core of steel which exteriorly has a rubber cladding of lower surface hardness than the core of the steel roller 20. Preferably, the relatively harder roller 21 has an outer coating of Teflon® which contributes in the elimination of tacking or sticking.

FIG. 2 schematically illustrates the production of a laminate material or packaging laminate using the method according to another embodiment of the present invention. The method according to FIG. 2 is similar to the above-described method according to FIG. 1 and, for purposes of clarity, the same reference numerals have therefore been employed for similar or corresponding parts and details, with the addition of a single apostrophe.

The method which is illustrated in FIG. 2 differs from the above-described method according to FIG. 1 primarily in respect of the manner in which the first web 10'a and the second web 10'b are brought together at the illustrated roller combination 20', 21' which, in FIG. 2 includes three separate roller pairs 20', 21' and roller nip 19', respectively, through which the united webs are led in sequence for the formation of the well integrated packaging laminate 10'. Consequently, the roller combination 20', 21' includes a first roller pair 20', 21', a second roller pair 20', 21' and a third roller pair 20', 21', the roller 21' in each respective roller pair preferably consisting of one and the same common roller for all roller pairs, while the rollers 20' in each respective roller pair are peripherally distributed about the periphery of the common roller 21', as illustrated. Also in this embodiment, the illustrated smaller roller 20' in each respective roller pair 20', 21' is disposed to be capable of being displaced in relation to the illustrated larger roller 21' for adjustment of a suitable compression nip (pressure). Preferably, the rollers 20' and 21' display mutually different surface hardnesses, the smaller roller 20' being the relatively softer roller of the two, while the larger roller 21' is the relatively harder.

The nips 19' are preferably kept at mutually different temperatures T1, T2 and T3, with increasing temperature in the linear direction of the webs, i.e. T1<T2<T3. The common larger roller 21' preferably consists of stainless steel, while each respective smaller roller 20', like the roller 20 in FIG. 1, may comprise a cylindrical roller core of stainless steel which has an external rubber cladding. In order to avoid sticking or tacking, the roller 21' may moreover have an outer coating of Teflon®.

Different types of packaging laminates as illustrated in FIGS. 3 and 4 may be produced by the method according to the present invention.

FIG. 3 shows examples of a packaging laminate 30 for a dimensionally stable package which includes a core layer 31 of paper or paperboard of suitable packaging quality, an extruded thermoplastic layer 32 and an outer layer 33 of a barrier material of previously mentioned type which has been applied to and permanently united with the thermoplastic coating 32 using the method according to the present invention.

FIG. 4 shows examples of a packaging laminate 40 for a flexible package of the bag type, which comprises a first layer 41 of plastic and a second layer 42 of plastic which has been permanently united with the first plastic layer 41 using the method according to the invention. The material in each respective plastic layer 41 and 42 may be a polymer of the previously mentioned type. In one alternative embodiment, the packaging laminate 40 may also include one or-more additional (not shown) layers of plastic or other material, for example aluminium (Alifoil) or silicon oxide ($S_iO_x$) between the two illustrated outer plastic layers 41 and 42.

By way of conclusion, it should once again be observed that the present invention which has been described above with particular reference to the accompanying figures, is not restricted to these embodiments described and shown exclusively by way of example, and that modifications and alterations obvious to a person skilled in the art are possible without departing from the spirit and scope of the inventive concept as disclosed in the appended claims.

What is claimed is:

1. A method of producing a laminate material suitable for use in packaging material, comprising:
   providing a pre-manufactured first web comprising a layer of polyethylene extruded at a temperature Te above a breakpoint temperature which is higher than a normal melting temperature Tm of the extruded polyethylene, said layer of polyethylene having an outer surface;
   providing a second web comprising a layer of PET or OPET, said PET or OPET having an outer surface;
   subjecting the first web and the second web to a non-chemical surface activation treatment in a continuous process; and
   contacting the outer surface of the polyethylene layer of the first web with the outer surface of the PET or OPET layer of the second web and permanently uniting the first and second webs which have been subjected to the surface activation treatment with one another by simultaneous application of heat and pressure, wherein the webs are united with one another and together led through a nip between pairs of rotating rollers of mutually different surface hardnesses, a relatively softer roller in each respective pair being pressed against a relatively harder roller.

2. The method as claimed in claim 1, wherein the relatively harder roller in each respective roller pair consists of one and the same roller common to all roller pairs, the relatively softer rollers in each respective roller pair being distributed about the periphery of the common roller.

3. The method as claimed in claim 1, wherein the relatively harder roller in each respective roller pair is supplied with heat for transferring to the bypassing webs.

4. The method as claimed in claim 1, wherein the relatively harder roller in each respective roller pair consists of steel, and the relatively softer roller includes a rubber-clad, cylindrical roller with a core of steel.

5. The method as claimed in claim 4, wherein the relatively harder roller or the relatively softer roller in each respective roller pair has an outer coating a heat resistant material which is non-stick in relation to the PET or OPET in the second web.

6. The method as claimed in claim 1, wherein the webs are united with one another and together led through nips between pairs of rotating rollers, wherein the roller nips are kept at mutually different temperatures which increase in a linear running direction of the web.

7. A method of producing a laminate material suitable for use in packaging material comprising:
   providing a pre-manufactured first web comprising a layer of polyethylene extruded at a temperature Te above a breakpoint temperature which is considerably higher than a normal melting temperature Tm of the extruded polyethylene, said layer of polyethylene having an outer surface;
   advancing the first web and a second web comprising a layer of PET or OPET, said PET or OPET having an outer surface, while subjecting the first and second webs to a non-chemical surface activation treatment; and
   contacting the outer surface of the polyethylene layer of the first web with the outer surface of the PET or OPET layer of the second web and permanently uniting the first and second webs with one another under simultaneous application of heat and pressure, wherein the uniting step includes passing the first and second webs between a series of pairs of rollers, one roller of each roller pair having a relatively soft surface and the other roller of each roller pair having a relatively hard surface, each pair of rollers in the series of pairs of rollers having a greater temperature than the preceding pair of rollers.

8. The method as claimed in claim 7 wherein the relatively harder roller in each respective roller pair consists of one and the same roller common to all roller pairs, the relatively softer rollers in each respective roller pair being peripherally distributed about a periphery of the common roller.

9. The method as claimed in claim 7, wherein the relatively harder roller in each respective roller pair is supplied with heat for transferring to the bypassing webs.

10. The method as claimed in claim 7, wherein the relatively harder roller in each respective roller pair consists of steel, and the relatively softer roller includes a rubber-clad, cylindrical roller with a core of steel.

11. The method as claimed in claim 10, wherein the relatively harder roller or the relatively softer roller in each respective roller pair has an outer coating of a heat resistant material which is non-stick in relation to the second web.

* * * * *